(12) United States Patent
Okada et al.

(10) Patent No.: US 10,086,864 B2
(45) Date of Patent: Oct. 2, 2018

(54) STEERING WHEEL POSITION-ADJUSTMENT DEVICE

(71) Applicant: NSK LTD., Tokyo (JP)

(72) Inventors: Shinji Okada, Gunma (JP); Yuuichi Tomaru, Gunma (JP)

(73) Assignee: NSK Ltd (JP)

( * ) Notice: Subject to any disclaimer, the term of this patent is extended or adjusted under 35 U.S.C. 154(b) by 46 days.

(21) Appl. No.: 15/302,704

(22) PCT Filed: Feb. 26, 2015

(86) PCT No.: PCT/JP2015/055587
§ 371 (c)(1),
(2) Date: Oct. 7, 2016

(87) PCT Pub. No.: WO2015/156050
PCT Pub. Date: Oct. 15, 2015

(65) Prior Publication Data
US 2017/0029011 A1    Feb. 2, 2017

(30) Foreign Application Priority Data

Apr. 8, 2014  (JP) ................. 2014-079169

(51) Int. Cl.
*B62D 1/189*  (2006.01)
*B62D 1/184*  (2006.01)
*B62D 1/187*  (2006.01)

(52) U.S. Cl.
CPC ............ *B62D 1/187* (2013.01); *B62D 1/184* (2013.01); *B62D 1/189* (2013.01)

(58) Field of Classification Search
CPC ........ B62D 1/189; B62D 1/187; B62D 1/184; B62D 1/18

(Continued)

(56) References Cited

U.S. PATENT DOCUMENTS

| 5,927,152 A * | 7/1999 | Marzio | B62D 1/184 280/775 |
| 2014/0252753 A1 | 9/2014 | Schnitzer | |
| 2015/0021890 A1* | 1/2015 | Morita | B62D 1/189 280/777 |

FOREIGN PATENT DOCUMENTS

| DE | 69715938 | 8/2003 |
| EP | 0600700 | 6/1994 |

(Continued)

OTHER PUBLICATIONS

European Extended Search Report dated Feb. 23, 2017.

*Primary Examiner* — Keith J Frisby
(74) *Attorney, Agent, or Firm* — Hartman Global IP Law; Gary M. Hartman; Domenica N. S. Hartman

(57) ABSTRACT

The occurrence of a collision sound between a driven-side cam 32a and a long tilt hole 25b in which the driven-side cam 32a engages when tilting an adjustment lever 18a for adjusting the position of a steering wheel is prevented. Bracket-side inclined surface sections 37 that are inclined in directions outward in the width direction going away in the forward-backward direction from both side edges in the forward-backward direction of a long tilt hole 25b are provided on both side edge sections in the forward-backward direction of the long tilt hole 25b in the outside surface of a support-plate section 24b. Cam-side inclined surface sections 38 that are inclined in directions outward in the width direction going away in the forward-backward direction from an engaging convex section 33a are provided in portions on both sides in the forward-backward direction of the engaging convex section 33a on the inside surface of the driven-side cam 32a.

9 Claims, 11 Drawing Sheets

(58) Field of Classification Search
USPC .................................. 74/493; 280/775, 779
See application file for complete search history.

(56) References Cited

FOREIGN PATENT DOCUMENTS

| | | |
|---|---|---|
| EP | 0792785 | 9/1997 |
| GB | 2259353 | 3/1993 |
| GB | 2411453 | 1/2006 |
| JP | 3016976 | 10/1995 |
| JP | 2002-087286 | 3/2002 |
| JP | 2003-112633 | 4/2003 |
| JP | 3116837 | 12/2005 |
| JP | 2008-183628 | 8/2008 |
| JP | 2011-121064 | 6/2011 |
| JP | 2011-161654 | 8/2011 |
| JP | 2012-111494 | 6/2012 |
| JP | 2014-058320 | 4/2014 |
| KR | 20140053641 A * | 5/2014 |
| WO | 2012-172334 | 12/2012 |

* cited by examiner

STEERING WHEEL POSITION-ADJUSTMENT DEVICE

TECHNICAL FIELD

The present invention relates to a steering wheel position-adjustment device that includes at least a tilt mechanism for adjusting the up-down position of a steering wheel according to the physique and driving posture of the operator.

BACKGROUND ART

FIG. 10 illustrates an example of a steering apparatus for an automobile. In this kind of steering apparatus, a steering shaft 5 is passed in the axial direction through a cylindrical shaped steering column 6 and supported by the steering column 6 so as to rotate freely; the front-end section of the steering shaft 5 is connected to the rear-end section of an intermediate shaft 8 by way of a universal joint 7; and the front-end section of the intermediate shaft 8 is connected to an input shaft 3 of a steering-gear unit 2 by way of a different universal joint 7. The steering wheel 1 is supported by and fastened to the rear-end section of the steering shaft 5. During operation, rotation of the steering wheel 1 is transmitted to the input shaft 3, and as the input shaft 3 rotates, a pair of left and right tie rods 4 of the steering-gear unit 2 are pushed and pulled, applying a steering angle to the front wheels.

A tilt mechanism for adjusting the up-down position of the steering wheel 1 and/or a telescopic mechanism for adjusting the forward-backward position of the steering wheel 1 according to the physique and driving posture of the operator are assembled in the steering apparatus for an automobile. Moreover, an electric-powered power steering apparatus, having an electric motor 17 as an auxiliary power source, is assembled in the steering apparatus for making it possible to reduce the force required for operating the steering wheel 1. The tilt mechanism is constructed so that the steering column 6 is supported by the vehicle body 10 by way of the housing 9 of the electric-powered power steering apparatus so that the steering column 6 can pivotally displace with respect to the vehicle body 10 centered around a pivot shaft (tilt shaft) 11 that is arranged in the width direction, and the portion near the rear end of the steering column is supported by a support bracket 12 that is supported by the vehicle body 10 so as to be able to displace in the up-down direction. The telescopic mechanism is constructed such that the steering column 6 is formed by combining together an outer column 13 and an inner column 14 in a telescopic shape so as to be able expand or contract freely; the steering shaft 5 is formed by combining together an outer shaft 15 and an inner shaft 16 so as to be able to transmit torque by a spline joint, and so as to be able to expand or contract; and the outer column 13 is supported by the support bracket 12 so as to be able to displace in the forward-backward direction. In this specification, the "width direction" means the width direction (left-right direction) of the vehicle body unless otherwise stated. Moreover, the "up-down direction" and "forward-backward" direction mean the up-down direction and forward-backward direction of the vehicle body unless otherwise stated.

In a steering apparatus for an automobile in which a tilt mechanism and a telescopic mechanism are assembled, except for an electric-powered type, operation of an adjustment lever switches between an unlocked state in which it is possible to adjust the position of the steering wheel 1, and a locked state in which the steering wheel 1 is maintained at the adjusted position. FIG. 11 illustrates an example of a steering wheel position-adjustment device in which switching between an unlocked state and locked stated is performed by expanding or contracting the dimension in the axial direction of a cam device 20 using an adjustment lever 18. In this device, depending on the expansion or contraction of the dimension in the axial direction of the cam device 20, switching is performed so that it is possible or not possible for there to be relative displacement of the displacement bracket 21 that is fastened to the outer column 13a with respect to the support bracket 12a, and so that it is possible or not possible for there to be sliding movement (relative displacement in the axial direction) between the outer column 13a and inner column 14a. The construction of this kind of cam device is disclosed in detail in JP2002087286 (A).

The outer column 13a is constructed such that a slit 22 is formed in the bottom surface, and by having the front-end section of that slit 22 open up to a front-end edge of the outer column 13a or a through hole in the circumferential direction that is formed in a portion of the outer column 13a near the front-end exclusive of the top end section, the inner diameter of the front half section can elastically expand or contract. A pair of held sections 23 of the displacement bracket 21 are provided in portions that are located on both sides of the slit 22 in the width direction.

In the locked state in which the position of the steering wheel 1 is maintained in the adjusted position, the pair of held sections 23 are strongly held by a pair of left and right support-plate sections 24 of the support bracket 12a. Long tilt holes 25 having a partial circular arc shape centered around a pivot shaft 11 (see FIG. 10) are formed in the support-plate sections 24, and long telescopic holes 26 that extend in the axial direction of the outer column 13a are formed in the held sections 23. An adjustment rod 19 is inserted through the long tilt holes 25 and the long telescopic holes 26. An anchor section 28 is provided on one end section (right end section in FIG. 11) of the adjustment rod 19, and that anchor section 28 engages with one of the long tilt holes 25 that is formed in one support-plate section (right side in FIG. 11) of the pair of support-plate sections 24, making only displacement along this one long tilt hole 25 possible, or in other words, rotation of the anchor section 28 is prevented. Between a nut 29 that is screwed onto and fastened on the other end section (left end section in FIG. 11) of the adjustment rod 19 and the outside surface of the other support-plate section (left side in FIG. 11) of the pair of support-plate sections 24, a thrust bearing 30 and the cam device 20 are arranged in that order starting form the side of the nut 29.

The cam device 20 includes a drive-side cam 31 and a driven-side cam 32. The driven-side cam 32 is supported by a portion near the other end of the adjustment rod 19 so as to be able to displace in the axial direction of the adjustment rod 19. An engaging convex section (boss section) 33 that is provided on the inside surface of the driven-side cam 32 engages with the other long tilt hole 25 that is formed in the other support-plate section 24, and as a result, relative rotation of the driven-side cam 32 with respect to the adjustment rod 19 is essentially prevented. The drive-side cam 31 is supported by the other end section of the adjustment rod 19 so that relative rotation with respect to the adjustment rod 19 is possible, and so that displacement of the drive-side cam 31 in the axial direction is prevented.

By tilting the adjustment lever 18 in a specified direction (generally downward) when adjusting the up-down or forward-backward position of the steering wheel 1, the drive-side cam 31 is rotated and driven. As illustrated in FIG. 12A, by rotating and driving the drive-side cam 31, a convex section 34 that is provided on the inside surface (right side surface in FIG. 11, bottom side surface in FIGS. 12A and 12B) of the drive-side cam 31 engages with a concave section 35 that is provided on the outside surface (left side surface in FIG. 11, top side surface in FIGS. 12A and 12B) of the driven-side cam 32, and the dimension in the axial direction of the cam device 20 contracts. As a result, the space between the inside surfaces of the driven-side cam 32 and the anchor section 28 that face each other expands, the surface pressure at the areas of pressure contact between the inside surfaces of the pair of support-plate sections 24 and the outside surfaces of the pair of held sections 23 of the displacement bracket 21 decreases, the inner diameter of the portion of the front-end section of the outer column 13a inside which the rear-end section of the inner column 14a fits elastically expands, and the surface pressure that acts on the area of contact between the inner-circumferential surface of the front section of the outer column 13a and the outer-circumferential surface of the rear section of the inner column 14a decreases. In this unlocked state, it becomes possible to adjust the up-down position and forward-backward position of the steering wheel 1 within the range that the adjustment rod 19 can displace inside the long tilt holes 25 and an elastic sleeve 27 that is mounted inside the long telescopic holes 26.

As illustrated in FIG. 12B, by tilting the adjustment lever 18 in the direction opposite the specified direction (generally, upward) after the steering wheel 1 has been moved to a desired position, the drive-side cam 31 is rotated and driven, and by the tip-end surface of the convex section 34 of the drive-side cam 31 engaging with a stepped section 36 that is provided on the outside surface of the driven-side cam 32, the dimension in the axial direction of the cam device 20 expands. As a result, the space between the inside surfaces of the driven-side cam 32 and the anchor section 28 that face each other contracts, the space between the inside surfaces of the pair of support-plate sections 24 contracts, the surface pressure at the areas of contact between the inside surfaces of the support-plate sections 24 and the outside surfaces of the held sections 23 increases, the inner diameter of the portion on the front section of the outer column 13a inside which the rear section of the inner column 14 fits elastically contracts, and the surface pressure that acts on the area of contact between the inner-circumferential surface of the front section of the outer column 13a and the outer-circumferential surface of the rear section of the inner column 14a increases. In this locked state, the up-down position and the forward-backward position of the steering wheel 1 are maintained at the adjusted positions.

In the case of this kind of steering wheel position adjustment device, in order to be able to smoothly perform adjustment of the up-down position of the steering wheel 1, it is necessary that the engaging convex section 33 be able to displace (raise or lower) smoothly on the inside of the long tilt hole 25 that is provided in the other support-plate section 24. In order for that, it is necessary to make the width in the forward-backward direction of the engaging convex section 33 a little less than the width in the forward-backward direction of the other long tilt hole 25. By making the width in the forward-backward direction of the engaging convex section 33 less than the width in the forward-backward direction of the other long tilt hole 25 in this way, a space exists between both side surfaces in the forward-backward direction of the engaging convex section 33 and the both side surfaces in the forward-backward direction of the other long tilt hole 25, and the engaging convex section 33 is able to rotate a little centered around the adjustment rod 19 in the inside of the other long tilt hole 25 by an amount corresponding to the size of that space.

When the adjustment lever 18 is tilted downward, a force in a direction that attempts to cause the engaging convex section 33 of the driven-side cam 32 to rotate on the inside of the other long tilt hole 25 centered around the adjustment rod 19 is applied to the driven-side cam 32 due to friction between the tip-end surface of the convex section 34 of the drive-side cam 31 and the stepped section 36 of the driven-side cam 32. By further tilting the adjustment lever 18 downward from this state, the convex section 34 moves in a sliding downward movement toward the convex section 35, being guided by an inclined surface 39 that is provided in a continuous section between the stepped section 36 and concave section 35. When this happens, not only does an inertial force act, but the elastic restoring force from the pair of held sections 23 and the adjustment lever's 18 own weight acts on the drive-side cam 31, and pushes the drive-side cam 31 in the direction of rotation. Then, the reaction force that is applied to the driven-side cam 32 from the drive-side cam 31 rotates the driven-side cam 32 with great force in the direction opposite the direction of rotation of the drive-side cam 31 (left direction in FIGS. 12A and 12B). Due to this kind of rotation of the driven-side cam 32, both side surfaces in the forward-backward direction of the engaging convex section 33 and both side surfaces in the forward-backward direction of the long tilt hole 25 collide, and there is a possibility that a harsh metallic sound (collision sound) will occur. Particularly, when the outer column 13a is made by die casting of a light metal alloy such as an aluminum alloy, the elastic restoring force from the pair of held sections 23 becomes large, and the collision sound becomes large.

JP2003112633 discloses construction in which a concave section is provided in a portion of the inside surface of the driven-side cam that surrounds the engaging convex section, and the inside surface of the driven-side cam comes in contact with the outside surface of the support-plate section only in the portion near the outer diameter of the driven-side cam. However, in this construction as well, as the adjustment lever is operated when adjusting the position of the steering wheel, the driven-side cam turns in the opposite direction from the drive-side cam, and there is a possibility that a metallic sound will be generated. British Patent No. 2,411,453 discloses construction in which protruding wall sections that are formed along the edges on both the front and rear sides of the long tilt hole engage with a concave section that is formed on the inside surface of the driven-side cam. However, in this construction, in order to smoothly perform adjustment of the up-down position of the steering wheel, it is necessary to make the width in the forward-backward direction of the concave section larger than the width in the forward-backward direction of the protruding wall sections. Therefore, even in this construction, there is a space between both sides in the forward-backward direction of the concave section and both side in the forward-backward direction of the protruding wall sections, so when the driven-side cam rotates, there is a possibility that a harsh metallic sound will be generated between the driven-side cam and the long tilt hole.

SUMMARY OF INVENTION

Taking into consideration the situation described above, the object of the present invention is to achieve construction of a steering wheel position-adjustment device that is capable of preventing the occurrence of a collision sound between the driven-side cam and the long tilt hole when tilting the adjustment lever in order to adjust the position of the steering wheel.

The steering wheel position-adjustment device of the present invention includes a steering column, a displacement bracket, a through hole, aa support bracket, long tilt holes, an adjustment rod, an anchor section, a driven-side cam, a drive-side cam and an adjustment lever.

The steering column is cylindrical, and is supported by a vehicle body so as to be able to pivotally displace centered around a pivot shaft (tilt shaft) that is arranged in the width direction. A steering shaft is supported on the inside of the steering column so as to be able to rotate freely, and a steering wheel is supported by and fastened to the rear end section of the steering shaft.

The displacement bracket is provided in the middle section in the axial direction of the steering column. The through hole is provided in the displacement bracket so as to pass in the width direction through the displacement bracket.

The support bracket includes a pair of support-plate sections that are located on both sides in the width direction of the displacement bracket, and is supported by the vehicle body. The long tilt holes are provided in portions of the pair of support-plate sections that are aligned with each other, and extend in the up-down direction.

The adjustment rod is inserted in the width direction through the through hole and the long tilt holes. The anchor section is provided in a portion on one end section of the adjustment rod that protrudes from the outside surface of one support-plate section of the support-plate sections, and engages in one long tilt hole of the long tilt holes that is provided in the one support-plate section so as to be able to displace only along that one long tilt hole.

The driven-side cam is fitted onto a portion near the other end of the adjustment rod that protrudes from the outside surface of the other support-plate section of the support-plate sections so as to be able to rotate relative to the adjustment rod, and includes an inside surface, an engaging boss section that is provided on the inside surface and that engages in the other long tilt hole of the long tilt holes that is provided in the other support-plate section so as to be able to displace along that other long tilt hole, an outside surface, and a driven-side cam surface that is provided on the outside surface and that is an uneven surface in the circumferential direction.

The drive-side cam is fitted onto the other end section of the adjustment rod so as to be able to rotate centered around the adjustment rod, and is prevented from displacement toward the other end side of the adjustment rod, and includes an inside surface, a drive-side cam surface that is provided on the inside surface and that is an uneven surface in the circumferential direction and that engages with the driven-side cam surface.

The adjustment lever includes a base-end section that is connected to the drive-side cam, and by being tilted centered around the adjustment rod, rotates and drives the drive-side cam. Rotating and driving the drive-side cam changes the state of engagement between the driven-side cam surface and the drive-side cam surface, making it possible to switch between an unlocked state in which it is possible to adjust the position of the steering wheel, and a locked state in which it is possible to maintain the position of the steering wheel.

Partiularly, in the steering wheel position-adjustment device of the present invention, a bracket-side inclined surface section that is inclined in a direction outward in the width direction going away in the forward-backward direction from the other long tilt hole is provided on at least one side edge section of the both front and rear side edge sections of the other long tilt hole in the outside surface of the other support-plate section. Moreover, a cam-side inclined surface section that is inclined in a direction outward in the width direction going away in the forward-backward direction from the engaging boss section is provided on a portion in the inside surface of the driven-side cam that faces the bracket-side inclined surface section when the engaging boss section is engaged in the other long tilt hole, so as to closely face or come in contact with the bracket-side inclined surface section.

When embodying the present invention, preferably the bracket-side inclined surface section is provided on each of the both front and rear side edge sections of the other long tilt hole in the outside surface of the other support-plate section. Moreover, preferably the cam-side inclined surface section is also provided in each of the portions in the inside surface of the driven-side cam that faces the bracket-side inclined surface section.

When embodying the present invention, the bracket-side inclined surface section can be shaped so as to have a fixed inclination angle with respect to the forward-backward direction. Moreover, the cam-side inclined surface section can also be shaped so as to have a fixed inclination angle with respect to the forward-backward direction. In this case, preferably the fixed inclination angle is 4° to 8°. Furthermore, preferably the bracket-side inclined surface section and the cam-side inclined surface section have the same inclination angle.

When embodying the present invention, the cross-sectional shape of the inclined surface section of at least one of the bracket-side inclined surface section and cam-side inclined surface section can be a partial arc shape. In this case, preferably the angle with respect to the forward-backward direction of the tangential line of the partial arc shape of the cross-sectional shape of the center section in the forward-backward direction of the at least one inclined surface section is 4° to 8°.

The present invention can be suitably used when, of the steering column, at least the displacement bracket is made of a light metal alloy such as an aluminum alloy or magnesium alloy.

When embodying the present invention, the steering column can include an inner column that is arranged on the front side, and an outer column that is arranged on the rear side and has a front-end section that fits with the rear-end section of the inner column so as to be able to displace in the axial direction. In this case, the outer column is made of a light metal alloy such as an aluminum alloy or magnesium alloy, and can have a slit in the front-end section that extends in the axial direction. Moreover, the displacement bracket can include a pair of held sections that are provided in portions of the outer-circumferential surface of the outer column that are located on both sides in the width direction of the slit.

When embodying the present invention, preferably the adjustment lever switches to the unlocked state when tilted downward, and switches to the locked state when tilted upward.

With the steering wheel position-adjustment device of the present invention, it is possible to prevent the occurrence of a collision sound between the driven-side cam and the long tilt hole when tilting the adjustment lever in order to adjust the position of the steering wheel. In other words, in the case of the present invention, with an engaging boss section of the driven-side cam engaged in a long tilt hole that is provided in the support-plate section on the side where the cam device is located, a bracket-side inclined surface section that is provided on the outside surface of the support-plate section closely faces or comes in contact with a cam-side inclined surface section that is provided on the inside surface of the driven-side cam. With this kind of construction, when a lock release operation using the adjustment lever is performed and a force causing the driven-side cam to rotate is applied to the driven-side cam, the cam-side inclined surface section tries to ride up onto the side of the bracket-side inclined surface section where the depth in the width direction from the portion on the outside surface of the support-plate section other than the portion where the bracket-side inclined surface section is formed is shallow. In other words, the area of contact between the bracket-side inclined surface section and cam-side inclined surface section tries to shift in a direction that expands the space between the inside surface of the support-plate section and the outside surface of the driven-side cam. When this happens, the direction in which the drive-side cam moves closer to the driven-side cam, and the outward facing force in the width direction that is applied to the driven-side cam as the cam-side inclined surface section rides up onto the bracket-side inclined surface section face each other, so the driven-side cam is pushed toward the support bracket and the surface pressure at the area of contact between the cam-side inclined surface section and the bracket-side inclined surface section increases. As a result, the friction that acts on this area of contact becomes large, and rotating of the engaging boss section of the driven-side cam on the inside of the long tilt hole is suppressed, so it is possible to prevent the occurrence of a collision sound.

MODES FOR CARRYING OUT INVENTION

Figure 10:
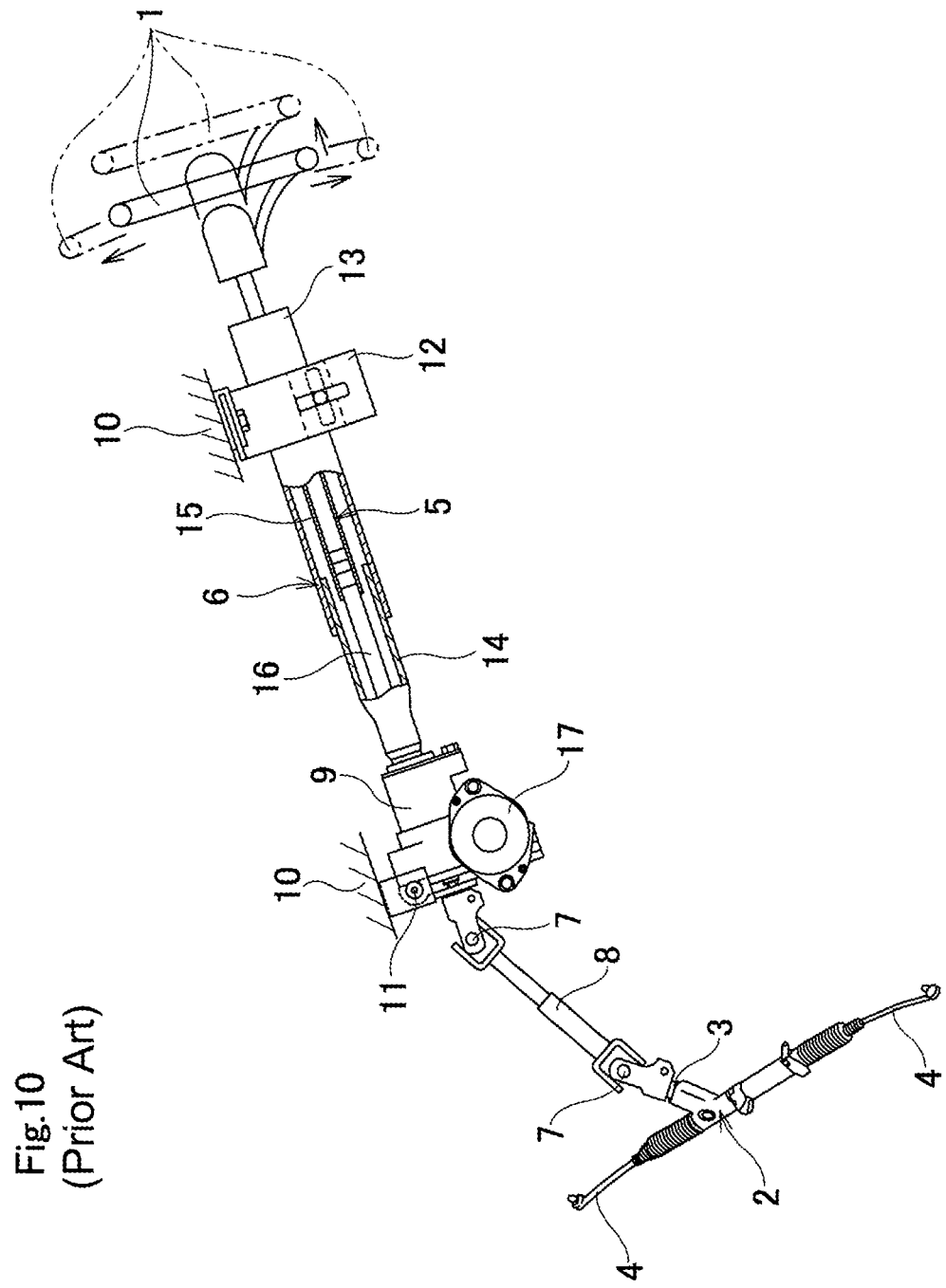
FIG. 10 is a partial cross-sectional side view of a conventional steering apparatus for an automobile that includes a telescopic mechanism and tilt mechanism.
Figure 11:
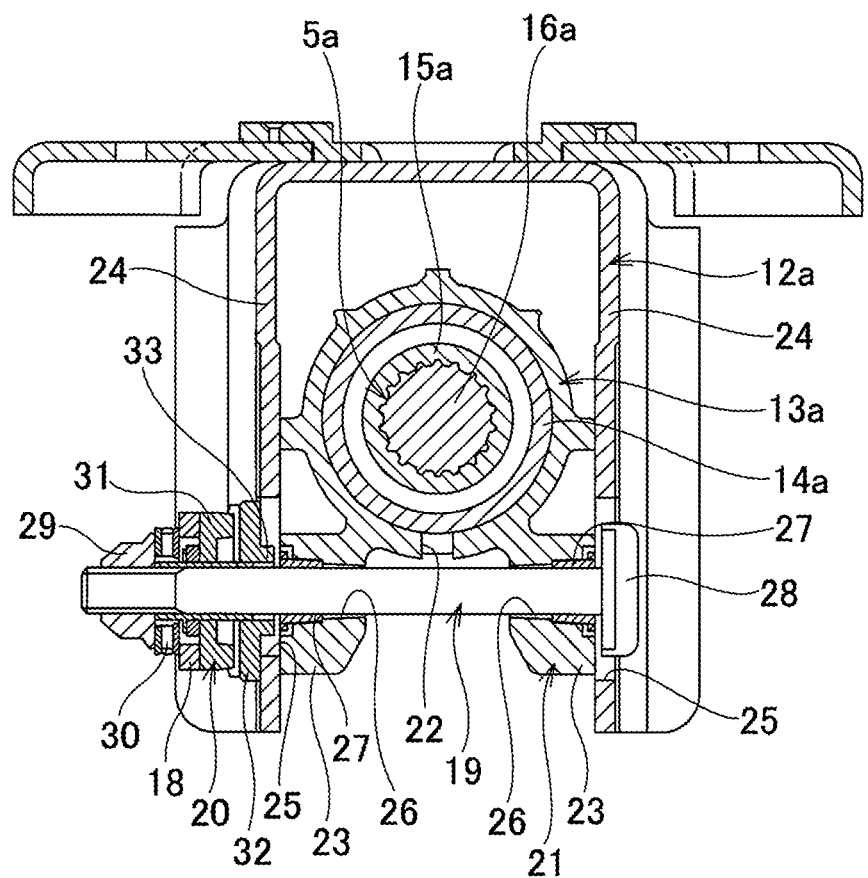
FIG. 11 is a cross-sectional view illustrating an example of conventional construction of a steering wheel position adjustment device.

FIG. 1 to FIG. 5 illustrate a first example of an embodiment of the present invention. A feature of the steering wheel position-adjustment device of the present invention, including this example, is preventing the occurrence of a collision sound between both side surfaces in the forward-backward direction of an engaging boss section 33a that is provided on the inside surface of a driven-side cam 32a and both side surfaces in the forward-backward direction of a long tilt hole 25b when an adjustment lever 18a is tilted downward in an unlocking direction in order to adjust the position of a steering wheel 1 (see FIG. 10).

The steering wheel position adjustment device of this example basically includes a steering column 6a, a displacement bracket 21a, a through hole 26a, a support bracket 12a, long tilt holes 25a, 25b, an adjustment rod 19a, an anchor section 28a, a driven-side cam 32a, a drive-side cam 31, and an adjustment lever 18a.

The steering wheel position-adjustment device of this example is such that in addition to a tilt mechanism for adjusting the up-down position of the steering wheel 1, a telescopic mechanism for adjusting the forward-backward position is assembled. Therefore, the entire steering column 6a has a cylindrical shape, and includes an outer column 13b that is arranged on the rear side, and an inner column 14a that is arranged on the front side. The outer column 13b and the inner column 14a are made by die casting of a light metal alloy such as an aluminum alloy, magnesium alloy and the like. The steering column 6a can also be formed using some other known arbitrary material, however, the present invention is particularly suitable for the case when the outer column 13b is made of a light alloy metal.

In order to construct the telescopic mechanism, the overall length of the steering column 6a is made to be able to expand or contract by fitting together the front-end section of the outer column 13b and the rear section of the inner column 14a so as to be able slide. Moreover, the outer column 13b is supported by the support bracket 12a so as to be able to displace in the forward-backward direction. The steering shaft 5a of the steering apparatus of an automobile is supported on the inside of the steering column 6a so as to be able to rotate freely. The steering shaft 5a is constructed by fitting together an outer shaft 15a and an inner shaft 16a with a spline fit so as to be able transmit torque and to be able to expand and contract. The steering wheel 1 is supported by and fastened to the rear-end section of the steering shaft 5a (outer shaft 15a).

The steering column 6a is supported by the vehicle body 10 (see FIG. 10) so as to be able to pivotally displace centered around a pivot shaft (tilt shaft) 11a that is arranged in the width direction. In this example, the front-end section of the inner column 14a is connected to the rear-end section of a housing 9 of an electric-powered power steering apparatus, and the steering column 6a is supported by the vehicle body 10 by way of the housing 9 and pivot shaft 11a. However, the present invention can also be applied even in the case of construction in which the front-end section of the inner column 14a is supported by the vehicle body 10 by way of only the pivot shaft 11a.

Moreover, the outer column 13b is supported by the support bracket 12a so as to be able to displace in the up-down direction and the forward-backward direction. A slit 22a that extends in the axial direction is formed in the top surface of the front-end section of the outer column 13b, and the inner diameter of the front section of the outer column 13b is able to elastically expand or contract. A pair of held sections 23a of a displacement bracket 23a are provided in portions on the top surface of the front-end section of the outer-circumferential surface of the outer column 13b that are on both sides in the width direction of the slit 22a. Long telescopic holes 26a that extend in the axial direction of the outer column 13b are formed in the held sections 23a. In other words, in this example, the long telescopic holes 26a integrally correspond to the through hole. The present invention can also be applied to construction of a steering wheel position adjustment device that includes only a tilt mechanism, and in that case, the steering column that includes the displacement bracket is a single member, and the through hole that is formed in the displacement bracket is a simple circular hole.

The support bracket 12a is made of metal plate that has sufficient rigidity such as steel, aluminum alloy and the like, and includes an installation-plate section 40 that is supported by the vehicle body 10, and a pair of support-plate sections 24a, 24b that are parallel with each other and provided so as to hang down from the installation-plate section 40. Long tilt holes 25a, 25b are formed in portions of the support-plate sections 24a, 24b that are aligned with each other (positions facing each other in the width direction) and that are aligned with part in the forward-backward direction of the long telescopic holes 26a, and these long tilt holes 25a, 25b extend in the up-down direction, or more specifically, in a circular arc direction that is centered around the pivot shaft 11a, or in the tangential direction of that circular arc.

The adjustment rod 19a is inserted through the inside of the long tilt holes 25a, 26b, and an elastic sleeves 27 that are mounted on the inside of the long telescopic holes 26a. An anchor section 28a is provided on a portion of one end section of the adjustment rod 19a (right-end section in FIG. 2, top-end section in FIG. 3) that protrudes from the outside surface of one support-plate section 24a (right one in FIG. 2, top one in FIG. 3) of the support-plate sections 24a, 24b. The anchor section 28a engages with one long tilt hole 25a of the long tilt holes 25a, 25b that is formed in the one support-plate section 24a, and is able to displace only along that long tilt hole 25a, or in other words, there is a space between the anchor section 28a and the one long tilt hole 25a, and rotation of the anchor section 28a is prevented.

A thrust bearing 30 and cam device 20a are provided between a nut 29 that is screwed and fastened to the other end section (left-end section in FIG. 2, bottom-end section in FIG. 3) and the outside surface of the other support-plate section 24b (left one in FIG. 2, bottom one in FIG. 3) of the support-plate sections 24a, 24b in that order from the nut 29 side. The cam device 20a includes a drive-side cam 31 and a driven-side cam 32a. The driven-side cam 32a is made by press molding of a sintered metal plate or steel plate and is fitted onto a portion near the other end of the middle section in the axial direction of the adjustment rod 19a that protrudes from the outside surface of the other support-plate section 24b so as to be able to rotate relative to the adjustment rod 19a. The driven-side cam 32a is supported by the adjustment rod 19a so as to be able to displace in the axial direction. The driven-side cam 32a includes an inside surface and an outside surface in the width direction. An engaging convex section (boss section) 33a is provided on the inside surface of the driven-side cam 32a, and this engaging boss section 33a engages in the other long tilt hole 25b of the long tilt holes 25a, 25b that is provided in the other support-plate section 24b, which prevents relative rotation of the driven-side cam 32a with respect to the adjustment rod 19a. In other words, the engaging boss section 33a engages in the other long tilt hole 25b by way of a space between the engaging boss section 33a and the other long tilt hole 25b so that displacement is possible along the other long tilt hole 25b, however, rotation centered around the adjustment rod 19a is prevented.

Figure 12A:
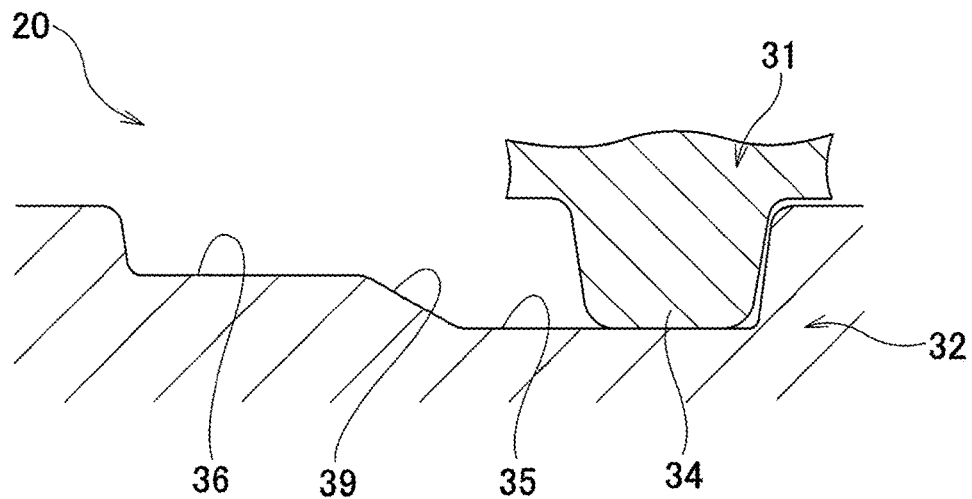
FIGS. 12A and 12B are schematic drawings for explaining the operation of a cam device in an example of conventional construction.
Figure 12B:
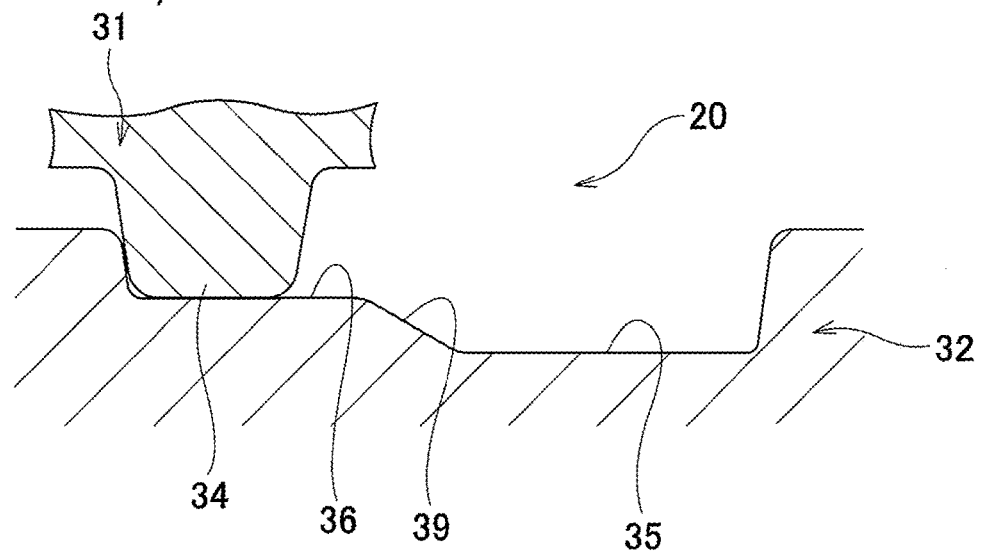

The width in the forward-backward direction of the engaging boss convex section 33a is a little less than the width in the forward-backward direction of the other long tilt hole 25b, or in other words, is smaller enough so that the engaging boss section 33a can smoothly displace along the other long tilt hole 25b. A driven-side cam surface 41, which is an uneven surface in the circumferential direction, is provided on the outside surface of the driven-side cam 32a. The driven-side cam surface 41 is constructed by repeatedly arranging a concave section 35, a stepped surface 36, and an inclined surface 39 (see FIGS. 12A and 12B) in the circumferential direction.

The drive-side cam 31 is made by press molding a sintered metal plate or steel plate, and is fitted onto the other end section of the adjustment rod 19a so as to be able to rotate centered around the adjustment rod 19a, and is prevented from displacement toward the other end side of the adjustment rod 19a. In other words, in this example, the drive-side cam 31 is able to rotate relative to the adjustment rod 19a, however, is supported by the adjustment rod 19a so that displacement in the axial direction is prevented. The drive-side cam 31 includes an inside surface in the width direction. A drive-side cam surface 42, which is an uneven surface in the circumferential direction, is provided on the inside surface of the drive-side cam 31. The drive-side cam surface 42 is constructed by providing convex sections 34 (see FIGS. 12A and 12B) at plural locations that are evenly spaced in the circumferential direction.

The adjustment lever 18a includes a base-end section that is connected to the drive-side cam 31, and by tilting the adjustment lever 18a centered around the adjustment rod 19a, the drive-side cam 31 is rotated and driven. By changing the engaged state between the driven-side cam surface 41 and the drive-side cam surface 42 by rotating and driving the drive-side cam 31, switching between the unlocked state in which position adjustment of the steering wheel 1 is possible, and the locked state in which the position of the steering wheel 1 is maintained.

In the steering wheel position adjustment device of this example, bracket-side inclined surface sections 37 that are inclined in a direction outward in the width direction while going away in the forward-backward direction (toward the front or toward the rear) from the both side edges in the forward-backward direction of the other long tilt hole 25b are provided on the both side edge sections in the forward-backward direction of the other long tilt hole 25b in the outside surface of the other support-plate section 24b. In other words, the bracket-side inclined surface sections 37 are such that the depth in the width direction from the portion of the outside surface of the other support-plate section 24b except the portion where the bracket-side inclined surface sections 37 are formed is the greatest at the both side edges in the forward-backward direction of the other long tilt hole 25b, and decreases going away in the forward-backward direction from the both side edges in the forward-backward direction. The bracket-side inclined surface sections 37 can be formed at the same time that the other long tilt hole 25b is formed by a punching process using a press on the other support-plate section 24b. Alternatively, the bracket-side inclined surface sections 37 can be formed after formation of the other long tilt hole 25b by performing a pressing process on the other support-plate section 24b.

Cam-side inclined surface sections 38 that are inclined in a direction outward in the width direction (toward the drive-side cam 31 side) while going away in the forward-backward direction from the engaging boss section 33a are provided on portions in the inside surface of the driven-side cam 32a that face the bracket-side inclined surface sections 37 with the engaging boss section 33a engaged with the other long tilt hole 25b, or in other words, portions on both sides in the forward-backward direction of the engaging boss section 33a. In other words, the cam-side inclined surface sections 38 are such that the depth in the width direction is a minimum on the engaging boss section 33a side, and increases going in the forward-backward direction away from the engaging boss section 33a. The cam-side inclined surface sections 38 can be formed at the same time when forming the driven-side cam 32.

In this example, with the engaging boss section 33a of the driven-side cam 32a engaged with the other long tilt hole 25b that is provided in the other support-plate section 24b, the bracket-side inclined surface sections 37 of the other support-plate section 24b come in contact with the cam-side inclined surface sections 38 of the driven-side cam 32a without a space. However, it is also possible to arrange the driven-side cam 32a so that the bracket-side inclined surface sections 37 of the other support-plate section 24b closely face the cam-side inclined surface sections 38 of the driven-side cam 32a through a small gap.

By tilting the adjustment lever 18a downward when adjusting the up-down position or forward-backward position of the steering wheel 1, the drive-side cam 31 is rotated and driven and the dimension in the axial direction of the cam device 20a contracts, which sets the unlocked state. As a result, the space between the inside surfaces of the driven-side cam 32a and the anchor section 28a that face each other expands. Consequently, the surface pressure of the contact pressure between the inside surfaces of the support-plate sections 24a, 24b and the outside surfaces of the held sections 23a decreases, the inner diameter of the front-end section of the outer column 13b elastically expands, and the surface pressure that acts at the area of contact between the inner-circumferential surface of the front section of the outer column 13b and the outer-circumferential surface of the rear section of the inner column 14a decreases. In this unlocked state, it becomes possible to adjust the up-down position and the forward-backward position of the steering wheel 1 within the range that the adjustment rod 19 is able to displace on the inside of the long tilt holes 25a, 25b, and the elastic sleeve 27 that is mounted inside the long telescopic holes 26a.

When the adjustment lever 18a is tilted upward after the steering wheel 1 has been moved to a desired position, the dimension in the axial direction of the cam device 20a is expanded and the locked state is set. In doing so, the space between the inside surfaces of the driven-side cam 32a and the anchor section 28a that face each other contracts, and furthermore, the space between the inside surfaces of the support-plate sections 24a, 24b contracts. As a result, the surface pressure at the areas of contact between the inside surfaces of the support-plate sections 24a, 24b and the outside surfaces of the held sections 23a increases, the inner diameter of the portion on the front-end section of the outer column 13b inside which the rear-end section of the inner column 14a fits elastically contracts, and the surface pressure acting on the area of contact between the inner-circumferential surface of the front section of the outer column 13b and the outer-circumferential surface of the rear section of the inner column 14a increases. In this locked state, the up-down position and the forward-backward position of the steering wheel 1 are maintained at the adjusted positions.

With the steering wheel position adjustment device of this example, when the adjustment lever 18a is tilted downward, the occurrence of a harsh metallic sound (collision sound) between both side surfaces in the forward-backward direction of the engaging boss section 33a of the driven-side cam 32a and both side surfaces in the forward-backward direction of the other long tilt hole 25b that is provided in the other support-plate section 24b is effectively prevented. In other words, in this example, the bracket-side inclined surface sections 37 that are provided on the outside surface of the other support-plate section 24b and the cam-side inclined surface sections 38 that are provided on the inside surface of the driven-side cam 32a come in contact. Therefore, by tilting the adjustment lever 18a downward, a force in the direction of rotation is applied to the driven-side cam 32a from the drive-side cam 31 due to friction force that acts between the convex section 34 and the inclined surface 39, and the cam-side inclined surface sections 38 at least partially try to ride up onto the side of the bracket-side inclined surface sections 37 where the depth in the width direction from the portion of the other support-plate section 24b other than the portion where the bracket-side inclination surface sections 37 are formed is shallow. In other words, the areas of contact between the bracket-side inclined surface sections 37 and the cam-side inclined surface sections 38 try to shift in a direction that increases the space between the inside surface of the other support-plate section 24b and the outside surface of the driven-side cam 32a. When this happens, the direction for the drive-side cam 31 to approach the driven-side cam 32a and the direction of a force outward in the width direction that is applied to the driven-side cam 32a as the cam-side inclined surface sections 38 ride up on the bracket-side inclined surface sections 37 face each other, so the driven-side cam 32a is pressed toward the other support-plate section 24b, and the surface pressure at the areas of contact between the bracket-side inclined surface sections 37 and the cam-side inclined surface sections 38 increases. As a result, friction that acts at the areas of contact between the bracket-side inclined surface sections 37 and the cam-side inclined surface sections 38 becomes large, and rotation of the engaging boss section 33a of the driven-side cam 32a inside the other long tilt hole 25b is suppressed, so it is possible to prevent the occurrence of a collision sound.

In this example, the inclination angle with respect to the forward-backward direction of the bracket-side inclined surface sections 37 and the cam-side inclined surface sections 38 is preferably 4° to 8°, and more preferably 5° to 7°, and even more preferably about 6°. When this inclination angle is less than 4° and excessively small, the surface pressure at the areas of contact between the bracket-side inclined surface sections 37 and the cam-side inclined surface sections 38 cannot become sufficiently high, and thus it is not possible to make the friction acting on the areas of contact sufficiently large. As a result, rotation of the engaging boss section 33a of the driven-side cam 32 inside the other long tilt hole 25b is not suppressed, and there is a possibility that a collision sound will occur between both side surfaces in the forward-backward direction of the engaging boss section 33a and both side surfaces in the forward-backward direction of the other long tilt hole 25b. On the other hand, when the inclination angle is greater than 8° and excessively large, the thickness of the both side edges in the forward-backward direction of the other long tilt hole 25b of the other support-plate section 24b becomes excessively small, and there is a possibility that the strength of these both side edges in the forward-backward direction will not be able to be maintained. In FIG. 3A to FIG. 5B, the inclination angle of the bracket-side inclined surface sections 37 and the cam-side inclined surface sections 38 are exaggeratedly illustrated.

Moreover, when the dimension in the axial direction of the cam device 20a is expanded by tilting the adjustment lever 18a upward in order to maintain the steering wheel 1 in the adjusted position, the cam-side inclined surface sections 38 of the driven-side cam 32a press the bracket-side incline surface sections 37 inward in the width direction. In other words, the pressure force that is generated by the cam device 20a due to the operation of the adjustment lever 18a is applied to the other support-plate section 24b at two locations that are separated in the forward-backward direction as illustrated by the large arrows in FIG. 5B, and is distributed and applied in an inclined direction with respect to the width direction (axial direction of the adjustment rod 19a). Therefore, the pressure force that is generated by the cam device 20a can effectively act as a force that causes the other support-plate section 24b to elastically deform inward in the width direction, or in other words, as a force that together with holding the displacement bracket 21a by the support-plate sections 24a, 24b from both sides in the width direction, causes the inner diameter of the front-end section of the outer column 13a to elastically contract. As a result, it is possible to maintain the position of the steering wheel 1 at the adjusted position without having to needlessly increase the operating force for operating the adjustment lever 18a. Furthermore, in this example, an engaging boss section 33a is provided on the inside surface of the middle section in the forward-backward direction where the reaction force to the force for pressing the other support-plate section 24b acts, so the thickness of the driven-side cam 32a is increased in this portion. Therefore, the strength of the driven-side cam 32a is sufficiently maintained even though cam-side inclined surface sections 38 are provided.

Moreover, in this example, the cam-side inclined surface sections 38 are provided in portions of the inside surface of the driven-side cam 32a on both sides in the forward-backward direction of the engaging boss section 33a, and the shape of the inside surface of the driven-side cam 32a has forward-backward symmetry. Therefore, when assembling the driven-side cam 32a into the other long tilt hole 25b of the other support-plate section 24b, there is no need to consider the orientation in the forward-backward direction, which makes it possible to improve the assembly work for assembling the steering wheel position adjustment device.

When embodying the present invention, it is also possible to provide a displacement bracket and slit on the bottom surface of the outer column. It is also possible to construct the steering column so that the front-end section of the inner column that is arranged on the rear side and the rear-end section of the outer column that is arranged on the front side are slidably fitted to each other.

Moreover, when embodying the present invention, it is possible to construct the adjustment lever so as to switch to the unlocked state when tilted upward, and switch to the locked state when tilted downward. However, when the adjustment lever is constructed so as to switch to the unlocked state when tilted downward as in this example, not only is an inertia force and the elastic restoration force of the pair of held sections, but also the weight of the adjustment lever itself acts on the drive-side cam, and the drive-side cam is pressed in the direction of rotation, so collision between the driven-side cam and both side surfaces in the forward-backward direction of the long tilt hole becomes even more severe and, the collision sound becomes large, so the effect of the invention is even larger.

Figure 1:
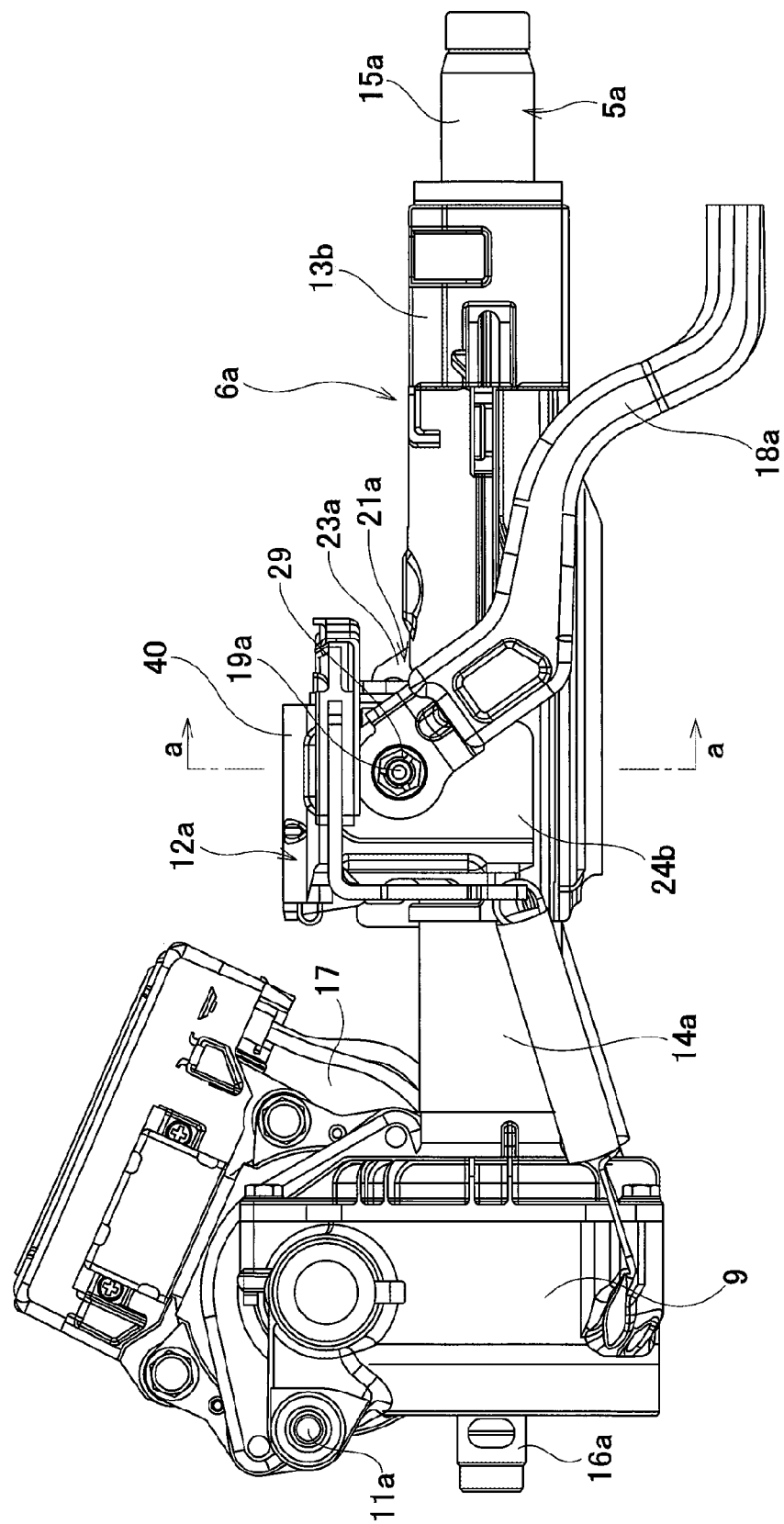
FIG. 1 is a side view illustrating a first example of an embodiment of the present invention.
Figure 2:
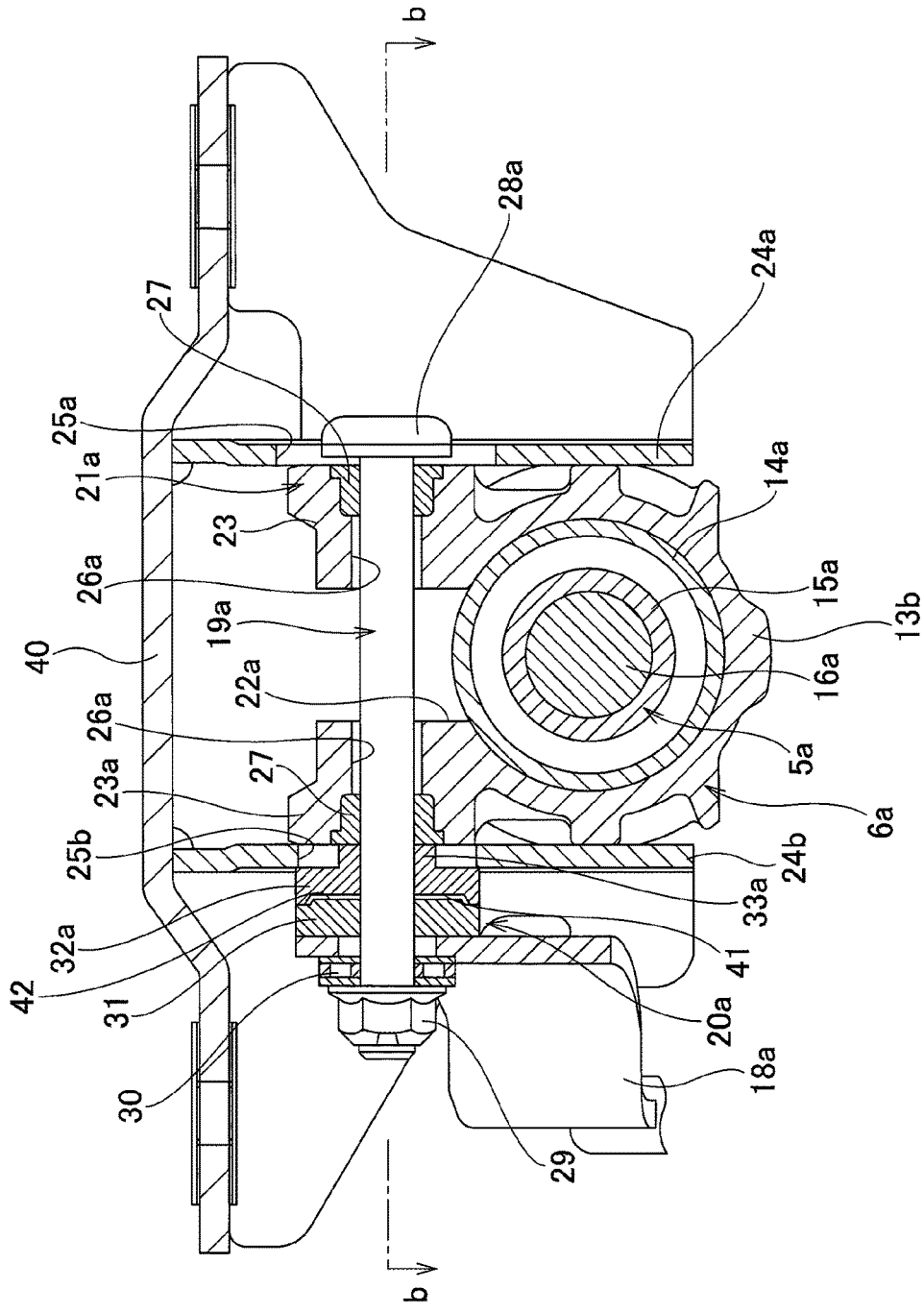
FIG. 2 is a cross-sectional view of section a-a in FIG. 1.
Figure 3:
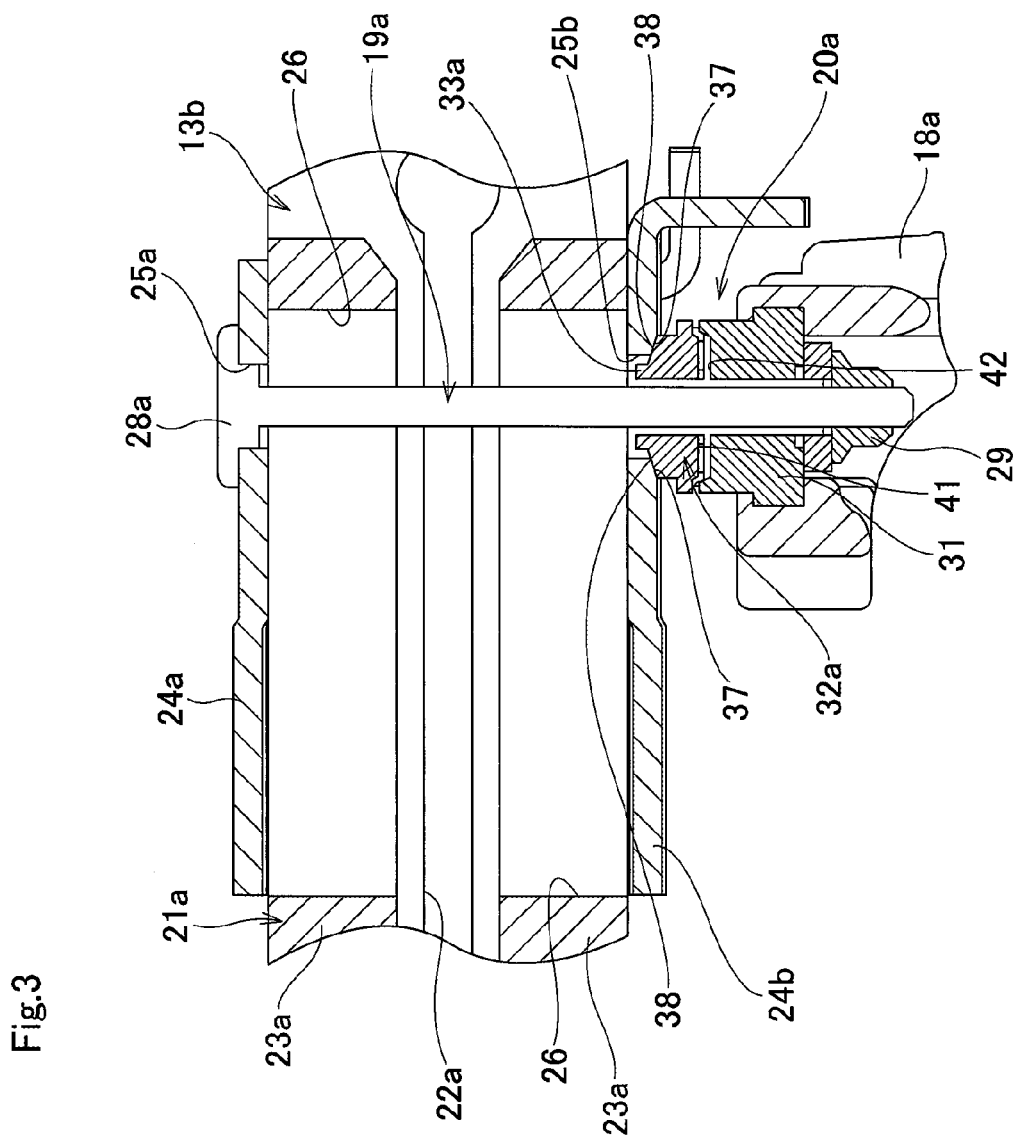
FIG. 3 is a cross-sectional view of section b-b in FIG. 2.
Figure 4:
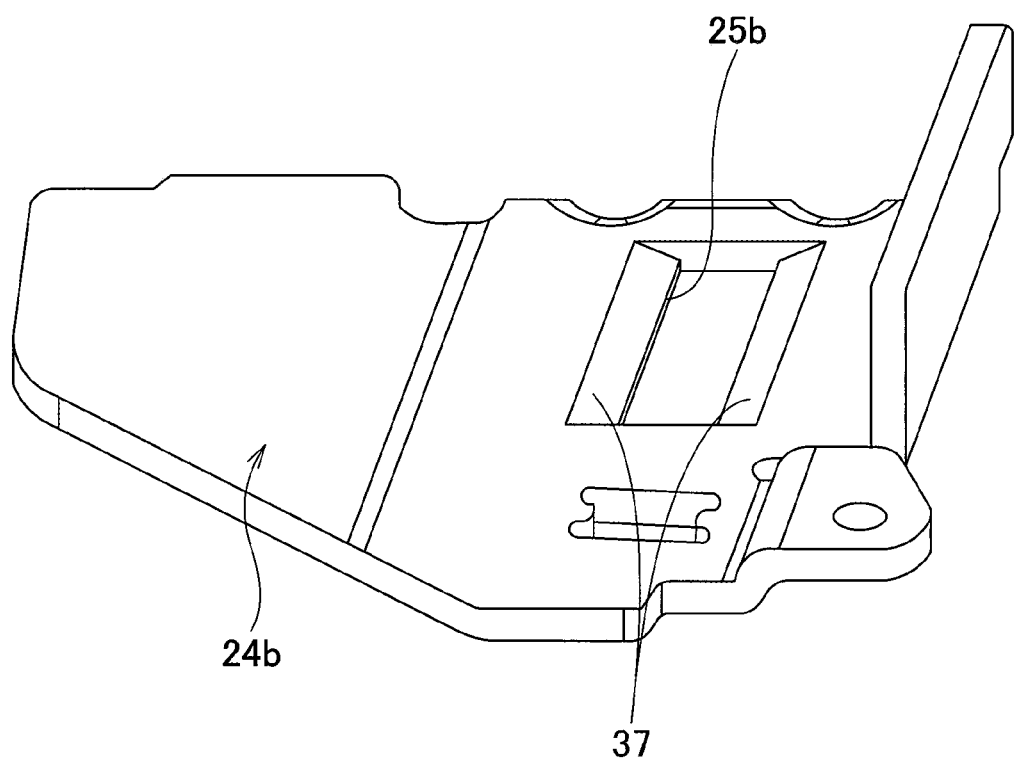
FIG. 4 is a perspective view illustrating the other support-plate section that has been removed from the first example of an embodiment of the present invention, in a state as seen from the outside in the width direction.
Figure 5:
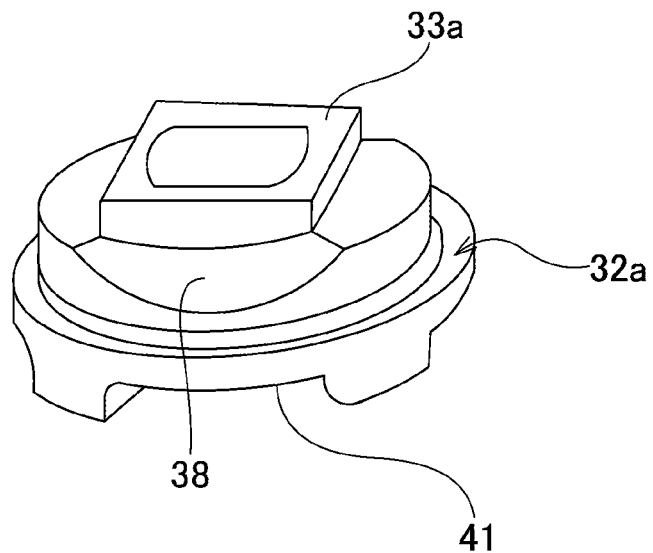
FIG. 5A is a perspective view illustrating the driven-side cam that has been removed from the first example of an embodiment of the present invention, in a state as seen from the inside surface side.
FIG. 5B is a schematic drawing illustrating the driven-side cam as seen from the side.
Figure 5:
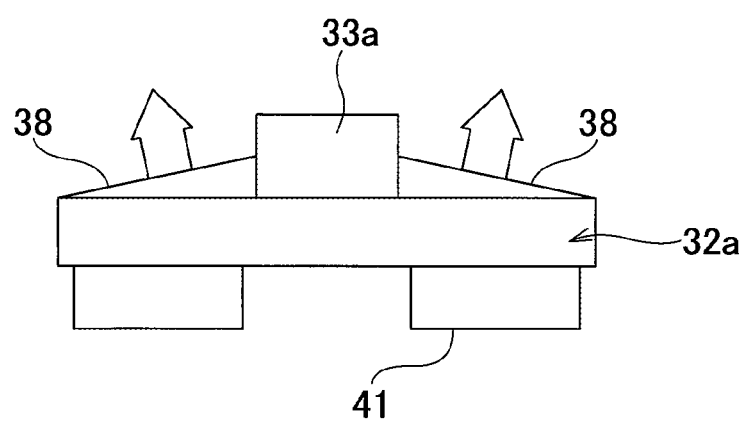
Figure 6:
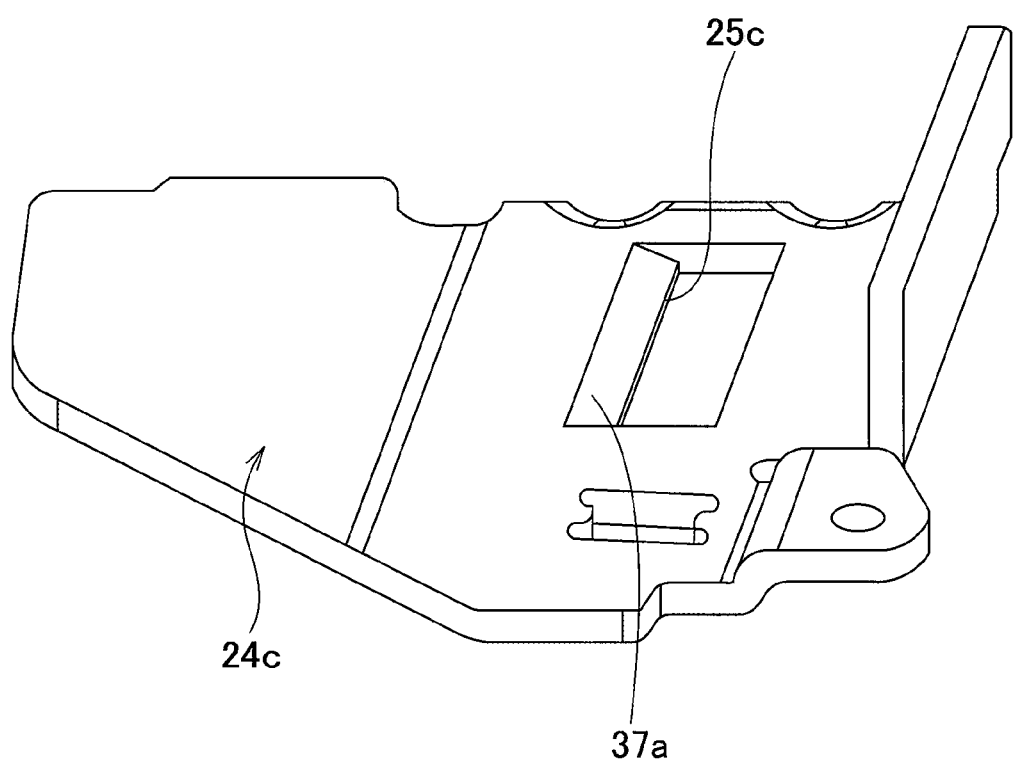
FIG. 6 is similar to FIG. 4, and illustrates a second example of an embodiment of the present invention.
Figure 7:
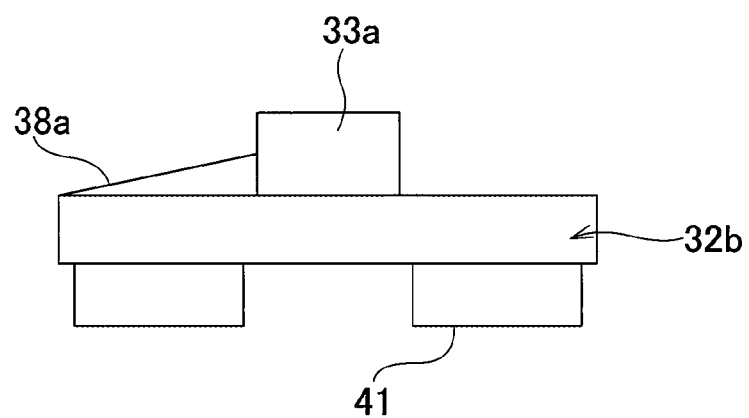
FIG. 7 is similar to FIG. 5B, and illustrates a second example of an embodiment of the present invention.
Figure 8:
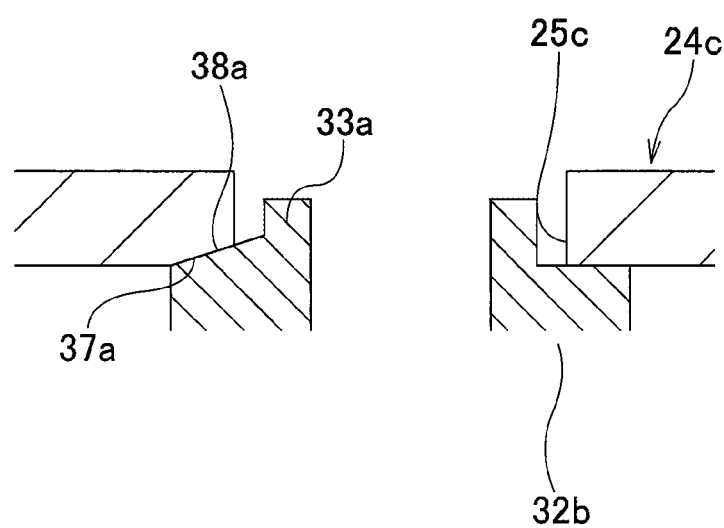
FIG. 8 is a cross-sectional view illustrating the engaged state between the bracket-side inclined surface section and cam-side inclined surface section in the second example of an embodiment of the present invention.

FIG. 6 to FIG. 8 illustrate a second example of an embodiment of the present invention. In the case of the steering wheel of this example, a bracket-side inclined surface section 37a that is inclined outward in the width direction going in the forward direction is provided on only the front-side edge section of the other long tilt hole 25c of the other support-plate section 24c. Moreover, a cam-side inclined surface section 38a that is inclined in a direction outward in the width direction going in the forward direction away from the engaging boss section 33a is provided in the front-side portion of the engaging boss section 33a of the inside surface of the driven-side cam 32b. When the adjustment lever 18a is tilted downward when adjusting the position of the steering wheel 1, the cam-side inclined surface section 38a tries to ride up onto the side of the bracket-side inclined section 37a where the depth in the width direction from a portion of the other support-plate section 24c other than where the bracket-side inclined surface section 37a is formed is shallow. In other words, the area of contact between the bracket-side inclined surface section 37a and the cam-side inclined surface section 38a tries to shift in a direction that increases the space between the inside surface of the other support-plate section 24c and the outside surface of the driven-side cam 32b. When this happens, the direction for the drive-side cam 31 to approach the driven-side cam 32b and the direction for the driven-side cam 32b to go away from the other support-plate section 24c of the support bracket 12a as the cam-side inclined surface section 38b rides up on the bracket-side inclined surface section 37a face each other, so the driven-side cam 32b is pressed toward the other support-plate section 24c, the surface pressure at the area of contact between the bracket-side inclined surface section 37a and the cam-side inclined surface section 38a increases, and the friction acting on this area of contact becomes large. As a result, the engaging boss section 33a of the driven-side cam 32b is prevented from rotating inside the other long tilt hole 25c, and the occurrence of a collision sound between the surface on the rear side of the engaging boss section 33a and the surface on the rear side of the other long tilt hole 25c is prevented.

Alternatively, construction is also possible in which a bracket-side inclined surface section is provided only on the rear-side edge section of the long tilt hole, and a cam-side inclined surface section is provided in the rear-side portion of the engaging boss section of the inside surface of the driven-side cam. The construction and functions of the other portions are the same as in the first example of an embodiment.

Figure 9:
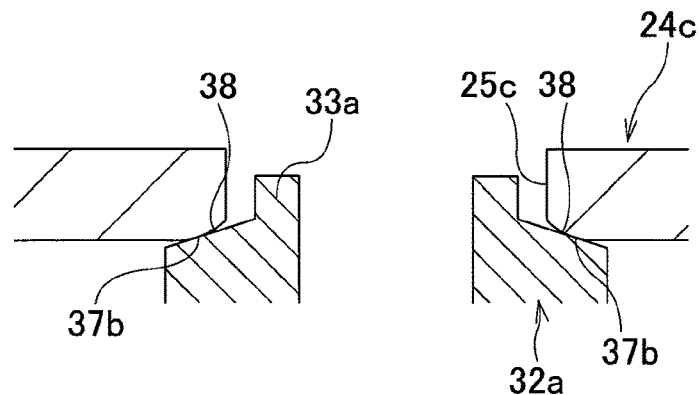
FIG. 9 is a cross-sectional view illustrating the engaged state between the bracket-side inclined surface section and cam-side inclined surface section in third to fifth examples of an embodiment of the present invention.
Figure 9:
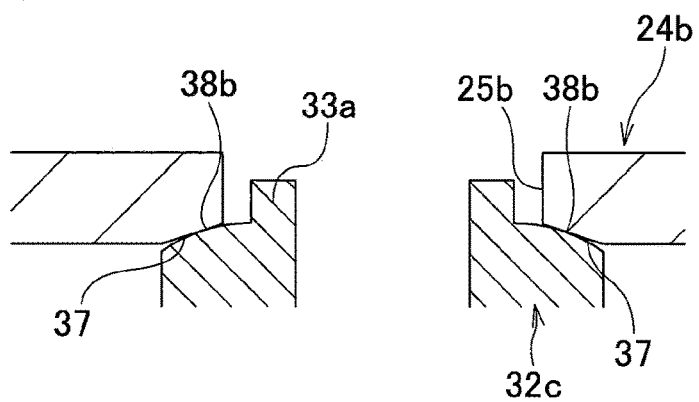
Figure 9:
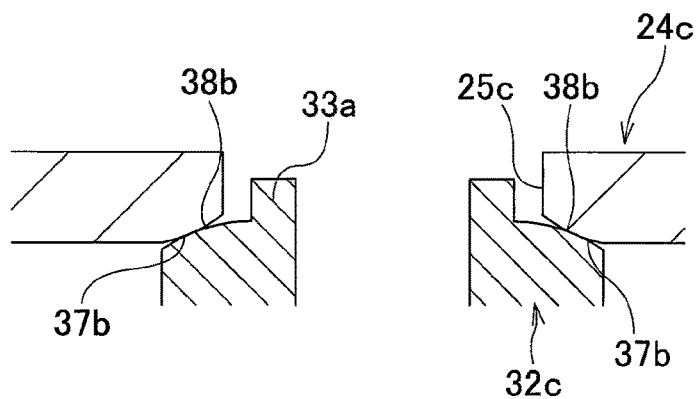

FIGS. 9A to 9C illustrate third to fifth examples of embodiments. In the third example illustrated in FIG. 9A, bracket-side inclined surface sections 37b having a partial circular arc-shaped cross-sectional shape are provided on both side edge sections in the forward-backward direction of the other long tilt hole 25c of the other support-plate section 24c. On the other hand, in the fourth example illustrated in FIG. 9B, cam-side inclined surface sections 38b having a partial circular arc-shaped cross-sectional shape are provided on both side portions in the forward-backward direction of the engaging boss section 33a of the inside surface of the driven-side cam 32c. In the fifth example illustrated in FIG. 9C, the other support-plate section 24c of the third example, and the driven-side cam 32c of the fourth example are combined.

In the third to fifth examples of an embodiment of the present invention, the inclination angles of the bracket-side inclined surface sections 37b and the cam-side inclined surface sections 38b are preferably regulated so that the angle with respect to the forward-backward direction of the tangent line of the partial arc shape of the cross-sectional shape in the center section in the forward-backward direction of these inclined surface sections is 4° to 8°.

In the third to fifth examples of an embodiment of the present invention, it is possible to keep the friction force that acts on the areas of contact between the bracket-side inclined surface sections and the cam-side inclined surface sections when the adjustment lever 18a is tilted downward small, and thus it is possible to smoothly adjust the up-down position of the steering wheel 1. The construction and functions of the other parts are the same as in the first embodiment.

What is claimed is:

1. A steering wheel position-adjustment apparatus, comprising:
    a cylindrical-shaped steering column supported by a vehicle body so as to be able to pivotally displace centered around a pivot shaft that is arranged in a width direction of the vehicle body, the steering column supporting a steering shaft on an inside of the steering column;
    a displacement bracket provided in a middle section in an axial direction of the steering column;
    a through hole provided in the displacement bracket so as to pass in the width direction through the displacement bracket;
    a support bracket including a pair of support-plate sections that are located on both sides in the width direction of the displacement bracket, the support bracket being supported by the vehicle body;
    a pair of long tilt holes provided in portions of the pair of support-plate sections that are aligned with each other, the long tilt holes extending in the up-down direction;
    an adjustment rod inserted in the width direction through the through holes and the long tilt holes;
    an anchor section provided in a portion on one end section of the adjustment rod that protrudes from an outside surface in the width direction of one support-plate section of the support-plate sections, the anchor section engaging in the one long tilt hole of the long tilt holes that is provided in the one support-plate section so as to be able to displace only along the one long tilt hole;
    a driven-side cam fitted onto a portion near the other end of the adjustment rod that protrudes from an outside surface in the width direction of the other support-plate section so as to be able to rotate relative to the adjustment rod, the driven-side cam including an inside surface in the width direction of the driven-side cam, an engaging boss section that is provided on the inside surface in the width direction of the driven-side cam and that engages in the other long tilt hole of the long tilt holes that is provided in the other support-plate section so as to be able to displace along the other long tilt hole, an outside surface in the width direction of the driven-side cam, and a driven-side cam surface that is provided on the outside surface in the width direction of the driven-side cam and that is an uneven surface in a circumferential direction of the driven-side cam;
    a drive-side cam fitted onto the other end section of the adjustment rod so as to be able to rotate centered around the adjustment rod with prevented from displacement toward the other end side of the adjustment rod, the drive-side cam including an inside surface in the width direction of the drive-side cam, and a drive-side cam surface that is an uneven surface in a circumferential direction of the drive-side cam that is provided on the inside surface in the width direction of the drive-side cam and that engages with the driven-side cam surface; and
    an adjustment lever including a base-end section that is connected to the drive-side cam, so as to be able to rotate and drive the drive-side cam by being tilted centered around the adjustment rod;
    the steering wheel position-adjustment device allowing of switching between an unlocked state in which it is possible to adjust the position of the steering wheel, and a locked state in which it is possible to maintain the position of the steering wheel, by rotating and driving the drive-side cam to change a state of engagement between the driven-side cam surface and the drive-side cam surface;
    a bracket-side inclined surface section that is inclined in a direction outward in the width direction going away in a forward-backward direction of the vehicle body from the other long tilt hole is provided on at least one side edge section of both the front and rear side edge sections of the other long tilt hole in the outside surface in the width direction of the other support-plate section;
    a cam-side inclined surface section that is inclined in a direction outward in the width direction going away in the forward-backward direction from the engaging boss section is provided on a portion in the inside surface in the width direction of the driven-side cam that faces the bracket-side inclined surface section when the engaging boss section is engaged in the other long tilt hole, so as to closely face or come in contact with the bracket-side inclined surface section; and
    when a lock release operation using the adjustment lever is performed and a force that causes the driven-side cam to rotate is applied to the driven-side cam, the bracket-side inclined surface section comes in contact with the cam-side inclined surface section, and the engaging boss section is prevented from rotating inside the other long tilt hole.

2. The steering wheel position-adjustment device according to claim 1, wherein the bracket-side inclined surface section is provided on each of the front and rear side edge sections of the other long tilt hole in the outside surface of the other support-plate section.

3. The steering wheel position-adjustment device according to claim 1, wherein at least one of the bracket-side inclined surface section and the cam-side inclined surface section has a fixed inclination angle with respect to the forward-backward direction.

4. The steering wheel position-adjustment device according to claim 3, wherein the fixed inclination angle is 4° to 8°.

5. The steering wheel position-adjustment device according to claim 1, wherein at least one of the bracket-side inclined surface section and the cam-side inclined surface section has a cross-sectionals shape that is constructed by a partial arc shape.

6. The steering wheel position-adjustment device according to claim 5, wherein an angle with respect to the forward-backward direction of the partial arc shape of the cross-sectional shape of a center section in the forward-backward direction of the at least one of the bracket-side inclined surface section and the cam-side inclined surface section is 420 to 8°.

7. The steering wheel position-adjustment device according to claim 1, wherein, at least the displacement bracket of the steering column is made of a light metal alloy.

8. The steering wheel position-adjustment device according to claim 1, wherein the steering column comprises: an inner column arranged on a front side of the steering column; and an outer column arranged on a rear side of the steering column and having a front-end section that fits with a rear-end section of the inner column so as to be able to displace in the axial direction;

the outer column is made of a light metal alloy, and comprises a slit in the front-end section that extends in the axial direction; and the displacement bracket comprises a pair of held sections that are provided in portions of an outer-circumferential surface of the outer column, and the displacement bracket is located on both sides in the width direction of the slit.

9. The steering wheel position-adjustment device according to claim 1, wherein the adjustment lever switches to the unlocked state when tilted downward, and switches to the locked state when tilted upward.

* * * * *